(12) United States Patent
Jin et al.

(10) Patent No.: US 8,507,609 B2
(45) Date of Patent: Aug. 13, 2013

(54) WEATHERABLE THERMOPLASTIC RESIN COMPOSITION HAVING EXCELLENT LOW GLOSS CHARACTERISTIC AND METHOD OF PREPARING THE SAME

(75) Inventors: Young Sub Jin, Uiwang-si (KR); So Young Kwon, Uiwang-si (KR); Sung Kwan Kim, Uiwang-si (KR); Hwan Seok Park, Uiwang-si (KR); Jae Keun Hong, Uiwang-si (KR); Byeong Do Lee, Uiwang-si (KR); Chul In Lim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 198 days.

(21) Appl. No.: 12/979,448

(22) Filed: Dec. 28, 2010

(65) Prior Publication Data
US 2011/0160396 A1    Jun. 30, 2011

(30) Foreign Application Priority Data

Dec. 31, 2009   (KR) .................. 10-2009-0136011

(51) Int. Cl.
| | |
|---|---|
| *C08L 33/08* | (2006.01) |
| *C08L 33/10* | (2006.01) |
| *C08L 33/12* | (2006.01) |
| *C08L 33/14* | (2006.01) |
| *C08L 33/20* | (2006.01) |
| *C08L 25/12* | (2006.01) |

(52) U.S. Cl.
USPC ........... 525/222; 525/53; 525/227; 525/230; 525/238; 525/241; 525/242; 525/263; 526/65; 526/329.3; 526/329.6; 526/342

(58) Field of Classification Search
USPC ............. 525/53, 222, 227, 230, 238, 241, 525/242, 263
See application file for complete search history.

(56) References Cited

U.S. PATENT DOCUMENTS

| | | | |
|---|---|---|---|
| 3,426,101 A | 2/1969 | Ryan et al. | |
| 3,944,631 A | 3/1976 | Yu et al. | |
| 4,169,869 A | 10/1979 | Milenius | |
| 4,460,742 A | 7/1984 | Kishida et al. | |
| 4,652,614 A | 3/1987 | Eichenauer et al. | |
| 4,668,737 A | 5/1987 | Eichenauer et al. | |
| 5,237,004 A | 8/1993 | Wu et al. | |
| 5,475,053 A | 12/1995 | Niessner et al. | |
| 5,580,924 A | 12/1996 | Wildi et al. | |
| 5,910,553 A | 6/1999 | McKee et al. | |
| 6,051,656 A | 4/2000 | McKee et al. | |
| 6,111,024 A | 8/2000 | McKee et al. | |
| 6,187,862 B1 | 2/2001 | Chang et al. | |
| 6,395,828 B1 | 5/2002 | Chang et al. | |
| 6,696,165 B1 | 2/2004 | Bennett et al. | |
| 6,890,965 B1 | 5/2005 | Johnson et al. | |
| 8,222,344 B2 * | 7/2012 | Jin et al. | 525/221 |
| 2004/0024122 A1 | 2/2004 | Chang et al. | |
| 2007/0287799 A1 | 12/2007 | Ha et al. | |
| 2010/0105840 A1 * | 4/2010 | Jin et al. | 525/222 |
| 2011/0160397 A1 | 6/2011 | Kwon et al. | |

FOREIGN PATENT DOCUMENTS

| | | |
|---|---|---|
| DE | 19614846 A1 | 10/1997 |
| JP | 07-316243 A | 12/1995 |
| KR | 10-2003-0034796 A | 5/2003 |
| KR | 2008-0036790 A | 4/2008 |

OTHER PUBLICATIONS

European Search Report in commonly owned European Application No. 09174487, dated Feb. 16, 2010, pp. 1-5.
European Office Action in commonly owned European Application No. 09174487 dated May 11, 2011, pp. 1-4.
Office Action in commonly owned U.S. Appl. No. 12/980,668 mailed Oct. 5, 2012, pp. 1-12.

* cited by examiner

*Primary Examiner* — Roberto Rabago

(74) *Attorney, Agent, or Firm* — Summa, Additon & Ashe, P.A.

(57) ABSTRACT

The present invention provides a thermoplastic resin composition which comprises (A) a (meth)acrylic acid alkyl ester-based polymer forming a network-shaped disperse phase; and (B) an aromatic vinyl-cyanide vinyl based copolymer forming a continuous phase. The thermoplastic resin composition of the present invention can have an excellent low gloss characteristics while maintaining basic physical properties of a weather resistance, impact strength, thermal resistance, and delamination characteristics.

13 Claims, No Drawings

WEATHERABLE THERMOPLASTIC RESIN COMPOSITION HAVING EXCELLENT LOW GLOSS CHARACTERISTIC AND METHOD OF PREPARING THE SAME

CROSS-REFERENCE TO RELATED APPLICATIONS

This application claims priority from Korea Patent Application No. 10-2009-0136011, filed on Dec. 31, 2009, in the Korean Intellectual Property Office, the disclosure of which is incorporated herein by reference in its entirety.

FIELD OF THE INVENTION

The present invention relates to a weather resistant thermoplastic resin that can have excellent low gloss characteristics and a method of preparing the same.

BACKGROUND OF THE INVENTION

Acrylonitrile-butadiene-styrene resins (also "ABS" resins) are used in a variety of applications including automobiles, electric and electronic equipment, business machinery, home appliances, toys, and the like due to their excellent impact resistance and workability, superior mechanical strength, thermal deformation temperature, and beautiful external appearance. However, ABS resins are easily deteriorated by sunlight and ultraviolet (UV) radiation since the butadiene-based rubber component used in the ABS resins comprises a chemically unstable double bond. Therefore, the use of ABS resins is limited for many products that are used outdoors and/or exposed to UV radiation, such as electric and electronic components, materials for farm machines and implements, road signboards, finishing materials for buildings, door panels, window frames, leisure/household goods, sports equipment, automobile supplies, and the like.

Weather resistant stabilizers can be added to ABS resins to improve weatherability. Techniques using weather resistant stabilizers can, however, have limited effectiveness. Accordingly, research efforts have looked to replacing ABS resins with acrylate-styrene-acrylonitrile (also "ASA" resins) resins, which include a chemically stable acrylic-based rubber instead of a butadiene-based rubber.

Recently, there has also been an increased focus on the development of thermoplastic resins that can be directly used without coating or painting due to environmental concerns. In addition, there is also increased demand for thermoplastic resins with low gloss characteristics in view of customer expectations, who often prefer the high-grade external appearance of low gloss products. For example, ASA resins used for outdoor applications can require low gloss characteristics.

Conventional methods for imparting a low gloss appearance to the surface of molded articles include embossing a surface of a molded article and coating the surface of the molded article with a low gloss material. The processing costs for such methods, however, can be expensive. Further, such methods may not sufficiently lower surface gloss. Therefore, there have been attempts to modify the ASA resins themselves to impart sufficiently low gloss characteristics.

U.S. Pat. No. 6,696,165 discloses a method for lowering the gloss of ASA resins by adding 0.1 to 20 parts by weight of a crystalline polymer such as a polyalkyl terephthalate, and U.S. Pat. No. 6,395,828 discloses a method for lowering the gloss of ASA resins by adding 0.5 to 15 parts by weight of a compound prepared by a reaction of an amine compound with epoxy.

U.S. Pat. Nos. 5,475,053 and 4,652,614 disclose methods of lowering the gloss of resins by using spherical graft copolymers as matting agents, and U.S. Pat. Nos. 4,169,869, 4,460,742 and 5,580,924, and Korean Patent Laid-Open Publication No. 2008-0036790 disclose methods of lowering the gloss of resins by using a variety of copolymers as additives.

Further, U.S. Pat. Nos. 4,668,737 and 5,237,004 disclose methods of lowering the gloss of resins by using rubber particles having a core/shell structure with a large particle diameter range of 0.05 to 20 μm or 2 to 15 μm.

However, problems including high production costs, delamination, property deterioration and partially increased gloss may occur when the additives are used as in the foregoing techniques. In addition, the use of large rubber particles can rapidly deteriorate the impact strength of the resins although the gloss of the resins can be advantageously lowered.

U.S. Pat. Nos. 3,426,101 and 6,187,862, Japanese Patent Laid-Open Publication No. Hei 7-316243, Korean Patent No. 10-0440474, and Korean Patent Application No. 2006-0051425 are directed to methods of preparing ASA resins by conventional techniques generally comprising the steps of preparing an alkyl acrylate-based latex core, preparing a graft polymer by graft polymerizing styrene and acrylonitrile on an outer layer of the core, and melting and kneading (mixing) the prepared graft polymer and a styrene-based thermoplastic resin. However, such methods of preparing the ASA resins use multiple steps which can increase production costs. Further such methods typically use a variety of emulsifiers and stabilizers to prepare the latex, which can deteriorate color characteristics.

U.S. Pat. Nos. 5,910,553, 6,111,024, and 6,051,656 disclose methods of preparing ASA resins by preparing alkyl acrylate copolymers through solution polymerization, drying the alkyl acrylate copolymers, performing bulk polymerization by injecting the dried alkyl acrylate copolymers into styrene-based monomers and acrylonitrile-based monomers, and converting the bulk polymerization into the suspension polymerization. However, these methods are not commercially viable, and there is the further drawback of additionally requiring a process to recover the final product from a suspension.

As discussed in the foregoing, despite the many attempts to provide ASA resins with excellent weatherability and low gloss characteristics, conventional techniques do not provide sufficient weatherability and gloss properties.

SUMMARY OF THE INVENTION

According to one aspect of the present invention, there is provided a weather resistant thermoplastic resin that can have excellent low gloss characteristics and a method of preparing the same. In an exemplary embodiment of the present invention, the thermoplastic resin comprises a (meth)acrylic acid alkyl ester-based polymer (A) and an aromatic vinyl-cyanide vinyl based copolymer (B), wherein the (meth)acrylic acid alkyl ester-based polymer (A) forms a network-shaped disperse phase and the aromatic vinyl-cyanide vinyl based copolymer (B) forms a continuous phase.

In an exemplary embodiment of the present invention, the thermoplastic resin comprises about 5 to about 35% by weight of the (meth)acrylic acid alkyl ester-based polymer (A) and about 65 to about 95% by weight of the aromatic vinyl-cyanide vinyl based copolymer (B).

In an exemplary embodiment of the present invention, the (meth)acrylic acid alkyl ester-based polymer (A) can be formed by polymerizing a mixture comprising a (meth)acrylic acid alkyl ester, a (meth)acrylic acid glycidyl ester, and a compound having either two or more carboxyl groups or two or more hydroxyl groups.

In another exemplary embodiment of the present invention, the (meth)acrylic acid alkyl ester-based polymer (A) may comprise about 60 to about 95% by weight of a (meth)acrylic acid alkyl ester, about 1 to about 20% by weight of a (meth)acrylic acid glycidyl ester, about 0 to about 20% by weight of an aromatic vinyl-based compound, and about 0 to about 10% by weight of a vinyl cyanide based compound.

In another exemplary embodiment of the present invention, the (meth)acrylic acid alkyl ester-based polymer (A) can include a polymerized compound having either two or more carboxyl groups or two or more hydroxyl groups in an equivalent ratio of about 0.1 to about 3 with respect to the (meth)acrylic acid glycidyl ester.

In another exemplary embodiment of the present invention, the (meth)acrylic acid alkyl ester-based polymer (A) may comprise the (meth)acrylic acid alkyl ester and the (meth)acrylic acid glycidyl ester as a main chain, and the epoxy group of the (meth)acrylic acid glycidyl ester connected with the compound having either two or more carboxyl groups or two or more hydroxyl groups by an ester linkage.

In an exemplary embodiment of the present invention, the aromatic vinyl-cyanide vinyl based copolymer (B) is formed by polymerizing about 60 to about 95% by weight of an aromatic vinyl-based compound, about 5 to about 40% by weight of a vinyl cyanide based compound, and about 0 to about 10% by weight of a (meth)acrylic acid alkyl ester. The aromatic vinyl-cyanide vinyl based copolymer (B) can have a weight-average molecular weight of about 150,000 to about 300,000.

Another aspect of the present invention provides a method for preparing a weather resistant thermoplastic resin of the present invention. A preparation method of the present invention comprises the steps of successively injecting a first monomer mixture comprising a (meth)acrylic acid alkyl ester and a (meth)acrylic acid glycidyl ester into a first reactor among plural reactors connected to each other in series to polymerize the first monomer mixture; and successively injecting the polymer polymerized in the first reactor, a second monomer mixture comprising an aromatic vinyl-based compound and a vinyl cyanide based compound, and a compound having two or more carboxyl groups or two or more hydroxyl groups into a second reactor to polymerize them.

In another exemplary embodiment of the present invention, the polymerization conversion ratio of a thermoplastic resin can be 85 to about 95% in a first reactor, and a final conversion ratio can be about 50 to about 70% in a final reactor.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a weather resistant thermoplastic resin that can have excellent low gloss characteristics. In an exemplary embodiment of the present invention, the thermoplastic resin comprises a (meth)acrylic acid alkyl ester-based polymer (A) and an aromatic vinyl-cyanide vinyl based copolymer (B), wherein said (meth)acrylic acid alkyl ester-based polymer (A) forms a network-shaped disperse phase and wherein said aromatic vinyl-cyanide vinyl based copolymer (B) forms a continuous phase.

The thermoplastic resin can include about 5 to about 35% by weight of the (meth)acrylic acid alkyl ester-based polymer (A) and about 65 to about 95% by weight of the aromatic vinyl-cyanide vinyl based copolymer (B). As another example, the thermoplastic resin can include about 5 to about 25% by weight of the (meth)acrylic acid alkyl ester-based polymer (A) and about 75 to about 95% by weight of the aromatic vinyl-cyanide vinyl based copolymer (B).

In some embodiments, the thermoplastic resin can include the (meth)acrylic acid alkyl ester-based polymer (A) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35% by weight. Further, according to some embodiments of the present invention, the amount of the (meth)acrylic acid alkyl ester-based polymer (A) can be in a range from about any of the foregoing amounts to about any other of the foregoing amounts.

In some embodiments, the thermoplastic resin can include the aromatic vinyl-cyanide vinyl based copolymer (B) in an amount of about 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the aromatic vinyl-cyanide vinyl based copolymer (B) can be in a range from about any of the foregoing amounts to about any other of the foregoing amounts.

If the amount of the (meth)acrylic acid alkyl ester-based polymer (A) is less than about 5% by weight or more than about 35% by weight, it can be difficult to obtain a weather resistant thermoplastic resin having excellent low gloss characteristics.

In one exemplary embodiment of the present invention, the (meth)acrylic acid alkyl ester-based polymer (A) formed in a disperse phase in the thermoplastic resin is formed by polymerizing a mixture comprising a (meth)acrylic acid alkyl ester, a (meth)acrylic acid glycidyl ester, and a compound having either two or more carboxyl groups or two or more hydroxyl groups.

The (meth)acrylic acid alkyl ester and (meth)acrylic acid glycidyl ester can be polymerized to form chains of the (meth)acrylic acid alkyl ester-based polymer (A) resulting from including a (meth)acrylic acid alkyl ester unit and a (meth)acrylic acid glycidyl ester unit as components of the main chain.

An epoxy group of the (meth)acrylic acid glycidyl ester unit is linked to the carboxyl groups or hydroxyl groups of the compound having either two or more carboxyl groups or two or more hydroxyl groups by ester bonds. Accordingly, the chains of the (meth)acrylic acid alkyl ester-based polymer (A) are linked to each other to form a network-shaped disperse phase.

The (meth)acrylic acid alkyl ester-based polymer (A) may be prepared by polymerizing a mixture comprising a (meth)acrylic acid alkyl ester, a (meth)acrylic acid glycidyl ester, and a compound having two or more hydroxyl groups.

When the aromatic vinyl-based compound and the vinyl cyanide based compound are polymerized altogether, the chains of the (meth)acrylic acid alkyl ester-based polymer (A) may include a unit of a (meth)acrylic acid alkyl ester, a unit of a (meth)acrylic acid glycidyl ester, and a unit of a compound having two or more hydroxyl groups. And, as aforementioned, the epoxy group of the (meth)acrylic acid glycidyl ester unit included in the polymer of the first reactor forms a dispersed phase by ester linkage with the compound having either two or more carboxyl groups or two or more hydroxyl groups.

In one exemplary embodiment of the present invention, the (meth)acrylic acid alkyl ester-based polymer (A) can be formed by polymerizing about 60 to about 95% by weight of a (meth)acrylic acid alkyl ester, about 1 to about 20% by weight of a (meth)acrylic acid glycidyl ester, about 0 to about 20% by weight of an aromatic vinyl-based compound, about 0 to about 10% by weight of a vinyl cyanide based compound, and a compound having either two or more carboxyl groups or two or more hydroxyl groups of an equivalent ratio of about 0.1 to about 3 with respect to the (meth)acrylic acid glycidyl ester.

In some embodiments, the (meth)acrylic acid alkyl ester-based polymer (A) can include the (meth)acrylic acid alkyl ester in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the (meth)acrylic acid alkyl ester can be in a range from about any of the foregoing amounts to about any other of the foregoing amounts.

In some embodiments, the (meth)acrylic acid alkyl ester-based polymer (A) can include the (meth)acrylic acid glycidyl ester in an amount of about 1, 2, 3, 4, 5, 6, 7 8, 9, 10, 11, 12, 13, 14, 15, 16, 17, 18, 19 or 20% by weight. Further, according to some embodiments of the present invention, the amount of the (meth)acrylic acid glycidyl ester can be in a range from about any of the foregoing amounts to about any other of the foregoing amounts.

In some embodiments, the (meth)acrylic acid alkyl ester-based polymer (A) may not include the aromatic vinyl-based compound (i.e., the (meth)acrylic acid alkyl ester-based polymer (A) may include 0% by weight of the aromatic vinyl-based compound). In some embodiments, the aromatic vinyl-based compound may be present in the (meth)acrylic acid alkyl ester-based polymer (A), i.e., the (meth)acrylic acid alkyl ester-based polymer (A) may include the aromatic vinyl-based compound in an amount of greater than and/or about 0, 1, 2, 3, 4, 5, 6, 7, 8, 9, 10, 11, 12, 13, 14, 15, 16, 17, 18, 19, or 20% by weight. Further, according to some embodiments of the present invention, the amount of the aromatic vinyl-based compound can be in a range from about any of the foregoing amounts to about any other of the foregoing amounts.

In some embodiments, the (meth)acrylic acid alkyl ester-based polymer (A) may not include the vinyl cyanide based compound (i.e., the (meth)acrylic acid alkyl ester-based polymer (A) may include 0% by weight of the vinyl cyanide based compound). In some embodiments, the vinyl cyanide based compound may be present in the (meth)acrylic acid alkyl ester-based polymer (A), i.e., the (meth)acrylic acid alkyl ester-based polymer (A) may include the vinyl cyanide based compound in an amount of greater than and/or about 0, 1, 2, 3, 4, 5, 6, 7, 8, 9, or 10% by weight. Further, according to some embodiments of the present invention, the amount of the vinyl cyanide based compound can be in a range from about any of the foregoing amounts to about any other of the foregoing amounts.

In some embodiments, the (meth)acrylic acid alkyl ester-based polymer (A) can include the compound having either two or more carboxyl groups or two or more hydroxyl groups of an equivalent ratio of about 0.1, 0.2, 0.3, 0.4, 0.5, 0.6, 0.7, 0.8, 0.9, 1, 2, or 3 with respect to the (meth)acrylic acid glycidyl ester. Further, according to some embodiments of the present invention, the amount of the compound having either two or more carboxyl groups or two or more hydroxyl groups can be in a range from about any of the foregoing amounts to about any other of the foregoing amounts.

If the amounts of the respective components are outside the above ranges, it can be difficult to provide a thermoplastic resin with sufficient weatherability or low gloss characteristics.

In particular, if the compound having either two or more carboxyl groups or two or more hydroxyl groups is present in an equivalent ratio of less than about 0.1 with respect to the (meth)acrylic acid glycidyl ester, it can be difficult to form a network-shaped disperse phase since links between the chains of the polymer (A) may be insufficient. Further, thermal resistance may be rapidly deteriorated if the compound having either two or more carboxyl groups or two or more hydroxyl groups is present in an equivalent ratio of more than about 3 because excess amounts of the compound having either two or more carboxyl groups or hydroxyl groups which do not participate in the reaction can function as a plasticizer in the continuous phase.

As another example, the (meth)acrylic acid alkyl ester-based polymer (A) can be formed by polymerizing about 75 to about 95% by weight of a (meth)acrylic acid alkyl ester, about 1 to about 10% by weight of the (meth)acrylic acid glycidyl ester, about 1 to about 10% by weight of an aromatic vinyl-based compound, about 1 to about 8% by weight of a vinyl cyanide based compound, and a compound having either two or more carboxyl groups or hydroxyl groups of an equivalent ratio of about 0.1 to about 2.5 with respect to the (meth)acrylic acid glycidyl ester.

As another example, the (meth)acrylic acid alkyl ester-based polymer (A) can be formed by polymerizing about 80 to about 95% by weight of a (meth)acrylic acid alkyl ester, about 1 to about 5% by weight of the (meth)acrylic acid glycidyl ester, about 2 to about 8% by weight of an aromatic vinyl-based compound, about 1 to about 5% by weight of a vinyl cyanide based compound, and a compound having either two or more carboxyl groups or hydroxyl groups of an equivalent ratio of about 0.5 to about 2.0 with respect to the (meth)acrylic acid glycidyl ester.

The (meth)acrylic acid alkyl ester of the (meth)acrylic acid alkyl ester-based polymer (A) can be a (meth)acrylic acid alkyl ester having a C1 to C10 alkyl group. Examples of the (meth)acrylic acid alkyl ester may comprise, but are not limited to, methyl methacrylate, ethyl methacrylate, propyl methacrylate, butyl methacrylate, pentyl methacrylate, hexyl methacrylate, heptyl methacrylate, octyl methacrylate, 2-ethyl hexyl methacrylate, methyl acrylate, ethyl acrylate, propyl acrylate, butyl acrylate, pentyl acrylate, hexyl acrylate, heptyl acrylate, octyl acrylate, 2-ethyl hexyl acrylate and the like. The (meth)acrylic acid alkyl ester may be employed singly or in the form of combinations of two or more thereof. From among these, it is desirable to use the butyl acrylate.

Examples of the aromatic vinyl-based compound may comprise, but are not limited to, styrene, α-methyl styrene, para-methyl styrene, and the like. The aromatic vinyl-based compound may be employed singly or in the form of combinations of two or more thereof. From among these, it is desirable to use the styrene.

Examples of the vinyl cyanide based compound may comprise, but are not limited to, acrylonitrile, methacrylonitrile, ethacrylonitrile, and the like. The vinyl cyanide based compound may be employed singly or in the form of combinations of two or more thereof. From among these, it is desirable to use the acrylonitrile.

Examples of the (meth)acrylate acid glycidyl ester compound may comprise, but are not limited to, glycidyl acrylate, glycidyl(meth)acrylate, and the like. The (meth)acrylate acid glycidyl ester may be employed singly or in the form of combinations of two or more thereof. From among these, it is desirable to use the glycidyl (meth)acrylate.

The compound having two or more carboxyl groups can have 2 to 10 carboxyl groups, and as another example 2 to 5 carboxyl groups. Further, the compound having two or more carboxyl groups can be a saturated compound in which its all carbon atoms within a molecule thereof are bonded by single bonds only. Examples of the compound having two or more carboxyl groups may comprise without limitation C2 to C10 alkanedioic acid, polyacid and the like. The compound having two or more carboxyl groups may be employed singly or in the form of combinations of two or more thereof.

Examples of the C2 to C10 alkanedioic acids may comprise, but are not limited to, butanedioic acid (succinic acid), pentanedioic acid (glutaric acid), hexanedioic acid (adipic acid), heptanedioic acid (pimelic acid), octanedioic acid (sueric acid), nonanedioic acid (azelaic acid), decanedioic acid (sebacic acid) and the like, and combinations thereof.

The polyacid can have an acid value of about 30 to about 300 and a weight average molecular weight of about 1,000 to about 5,000. Exemplary polyacids may comprise, but are not limited to, poly(meth)acrylic acids, styrene-(meth)acrylic acid polymers, styrene-maleic acid polymers and the like, and combinations thereof. For example, the polyacid can be Morez-101 of Rohm and Hass Corporation, Joneryl-678 and Joncryl-690 of BASF Corporation, Soluryl-20 and Soluryl-70 of Hanwha Chemical Corporation and the like, and combinations thereof.

The compound having two or more hydroxyl groups can have 2 to 10 hydroxyl groups, and as another example 2 to 5 hydroxyl groups. Further, the compound having two or more hydroxyl groups can be a saturated compound in which its all carbon atoms within a molecule thereof are bonded by single bonds only. Examples of the compound having two or more hydroxyl groups may comprise without limitation C2 to C10 alkanediols, ethylene glycol, polyethylene glycols, propylene glycol, polypropylene glycols, polyols and the like. The compound having two or more hydroxyl groups may be employed singly or in the form of combinations of two or more thereof.

Examples of the alkanediols with 2 to 10 carbon atoms may comprise, but are not limited to, 1,4-butandiol, 1,5-pentandiol, 1,6-hexandiol, 1,7-heptandiol, 1,8-octandiol and the like. Examples of the polyethylene glycols may comprise, but are not limited to, PEG300, PEG600, PEG1500 and the like depending on molecular weight thereof. Examples of the polyols may comprise, but are not limited to, xylitol, glycerin, erythritol, sorbitol, acrylic- or ester-based polyols having a hydroxyl value of about 50 to about 500 and a weight average molecular weight of about 500 to about 5,000, and the like.

The aromatic vinyl-cyanide vinyl based copolymer (B) formed in a continuous phase in the thermoplastic resin according to the present invention is formed by polymerizing an aromatic vinyl-based compound and a vinyl cyanide based compound.

The aromatic vinyl-cyanide vinyl based copolymer (B) may be formed by polymerizing a (meth)acrylic acid alkyl ester together with the aromatic vinyl-based compound and vinyl cyanide based compound.

For example, the aromatic vinyl-cyanide vinyl based copolymer (B) can be formed by polymerizing about 60 to about 95% by weight of an aromatic vinyl-based compound, about 5 to about 40% by weight of a vinyl cyanide based compound, and about 0 to about 10% by weight of a (meth)acrylic acid alkyl ester.

In some embodiments, the aromatic vinyl-cyanide vinyl based copolymer (B) can include the aromatic vinyl-based compound in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the aromatic vinyl-based compound can be in a range from about any of the foregoing amounts to about any other of the foregoing amounts.

In some embodiments, the aromatic vinyl-cyanide vinyl based copolymer (B) can include the vinyl cyanide based compound in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the vinyl cyanide based compound can be in a range from about any of the foregoing amounts to about any other of the foregoing amounts.

In some embodiments, the aromatic vinyl-cyanide vinyl based copolymer (B) may not include the (meth)acrylic acid alkyl ester (i.e., the aromatic vinyl-cyanide vinyl based copolymer (B) may include 0% by weight of the (meth)acrylic acid alkyl ester). In some embodiments, the (meth)acrylic acid alkyl ester may be present in the aromatic vinyl-cyanide vinyl based copolymer (B), i.e., the aromatic vinyl-cyanide vinyl based copolymer (B) may include the (meth)acrylic acid alkyl ester in an amount of greater than and/or about 0, 1, 2, 3, 4, 5, 6, 7, 8, 9, or 10% by weight. Further, according to some embodiments of the present invention, the amount of the (meth)acrylic acid alkyl ester can be in a range from about any of the foregoing amounts to about any other of the foregoing amounts.

If the amounts of the respective components are outside of the above ranges, the basic physical properties of the thermoplastic resin including impact resistance, yellowness, flow characteristics and the like may rapidly change.

As another example, the aromatic vinyl-cyanide vinyl based copolymer (B) can be formed by polymerizing about 60 to about 84% by weight of an aromatic vinyl-based compound, about 15 to about 35% by weight of a vinyl cyanide based compound, and about 1 to about 5% by weight of a (meth)acrylic acid alkyl ester.

Examples of the aromatic vinyl-based compound forming the aromatic vinyl-cyanide vinyl based copolymer (B) may comprise, but are not limited to, styrene, α-methyl styrene, para-methyl styrene and the like. The aromatic vinyl-based compound may be employed singly or in the form of combinations of two or more thereof. Examples of the vinyl cyanide based compound used in the aromatic vinyl-cyanide vinyl based copolymer (B) may comprise, but are not limited to, acrylonitrile, methacrylonitrile, ethacrylonitrile and the like. The vinyl cyanide based compound may be employed singly or in the form of combinations of two or more thereof.

The (meth)acrylic acid alkyl ester forming the aromatic vinyl-cyanide vinyl based copolymer (B) can be a (meth)acrylic acid alkyl ester having an alkyl group of 1 to 10 carbon atoms. Examples of the (meth)acrylic acid alkyl ester may comprise, but are not limited to, methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, and the like. The (meth)acrylic acid alkyl ester may be employed singly or in the form of combinations of two or more thereof.

The aromatic vinyl-cyanide vinyl based copolymer (B) can have a weight-average molecular weight of about 150,000 to about 300,000, for example about 180,000 to about 250,000. If the weight-average molecular weight in the continuous phase is less than about 150,000, rapid deterioration in impact strength and delamination may occur since the size of the disperse phase of the aromatic vinyl-cyanide vinyl based copolymer (B) can excessively increase. On the other hand, if the weight-average molecular weight in the continuous phase is more than about 300,000, the low gloss characteristics may deteriorate since the size of the disperse phase of the aromatic vinyl-cyanide vinyl based copolymer (B) can excessively decrease.

The thermoplastic resin according to the present invention can be prepared by continuous bulk polymerization. It is difficult to prepare the aforementioned network-shaped disperse phase using methods generally used to prepare a rubber phase, such as an emulsion polymerization method, a suspension polymerization method and the like. Further, using conventional methods, the final product should be prepared by methods such as melt extrusion and the like after separately preparing an aromatic vinyl-cyanide vinyl based copolymer formed in a continuous phase. Therefore, such methods make it difficult to efficiently prepare a weather resistant thermoplastic resin having excellent low gloss characteristics.

A thermoplastic resin of the present invention can have very excellent low gloss characteristics compared to conventional weather resistant thermoplastic resins. The thermoplastic resin can have a gloss value of about 30 or less, for example about 21 or less, which is measured using a 75 Degree Gloss Meter.

A thermoplastic resin according to the present invention can have excellent low gloss characteristics while maintaining basic physical properties of a weather resistant thermoplastic resin such as excellent flow characteristics, impact strength, thermal resistance, and transparency. Therefore, the thermoplastic resin may be widely used in electric and electronic components, materials for farm machines and implements, road signboards, finishing materials for building, door panels, window frames, leisure/household goods, sports goods, automobile supplies, and the like requiring both weatherability and low gloss characteristics.

Examples of a method of molding a thermoplastic resin according to the present invention to manufacture the aforementioned products may comprise, but not be limited to, extrusion, injection, casting and the like, which are widely used. A molding method may be easily performed by those skilled in the art.

Method of Preparing Thermoplastic Resin Having Excellent Low Gloss Characteristics The present invention provides a method of preparing the aforementioned weather resistant thermoplastic resin having excellent low gloss characteristics.

A preparation method according to one exemplary embodiment of the present invention comprises the steps of successively injecting a first monomer mixture comprising a (meth)acrylic acid alkyl ester and a (meth)acrylic acid glycidyl ester into a first reactor among plural reactors connected to each other in series to polymerize the first monomer mixture; and successively injecting the polymer polymerized in the first reactor, a second monomer mixture comprising an aromatic vinyl-based compound and a vinyl cyanide based compound, and a compound having two or more hydroxyl groups into a second reactor to polymerize them.

Specifically, a (meth)acrylic acid alkyl ester and a (meth)acrylic acid glycidyl ester are first mixed to prepare a first monomer mixture. The polymer is then prepared by successively injecting the first monomer mixture into the first reactor among plural reactors connected to each other in series and polymerizing the first monomer mixture.

The first monomer mixture may further optionally comprise an aromatic vinyl-based compound and a vinyl cyanide based compound.

For example, the first monomer mixture can comprise about 60 to about 95% by weight of a (meth)acrylic acid alkyl ester, about 1 to about 20% by weight of a (meth)acrylic acid glycidyl ester, about 0 to about 20% by weight of an aromatic vinyl-based compound, and about 0 to about 10% by weight of a vinyl cyanide based compound. If the amounts of the respective components in the first monomer mixture are outside of the above ranges, it can be difficult to provide a thermoplastic resin finally prepared with sufficient weatherability or low gloss characteristics.

As another example, the first monomer mixture can comprise about 70 to about 95% by weight of a (meth)acrylic acid alkyl ester, about 1 to about 10% by weight of a (meth)acrylic acid glycidyl ester, about 1 to about 10% by weight of an aromatic vinyl-based compound, and about 1 to about 8% by weight of a vinyl cyanide based compound. As another example, the first monomer mixture can comprise about 80 to about 95% by weight of a (meth)acrylic acid alkyl ester, about 1 to about 5% by weight of a (meth)acrylic acid glycidyl ester, about 2 to about 8% by weight of an aromatic vinyl-based compound, and about 1 to about 5% by weight of a vinyl cyanide based compound.

The (meth)acrylic acid alkyl ester and the (meth)acrylic acid glycidyl ester comprised in the first monomer mixture form chains of the (meth)acrylic acid alkyl ester-based polymer (A) through the polymerization reaction in the first reactor. Additionally, when the first monomer mixture further comprises the aromatic vinyl-based compound and the vinyl cyanide based compound, the chains of the polymer (A) further comprise an aromatic vinyl-based compound unit and a vinyl cyanide based compound unit.

The polymer prepared from the first monomer mixture in the first reactor is successively injected into the second reactor, and at the same time, a second monomer mixture comprising the aromatic vinyl-based compound and the vinyl cyanide based compound and the compound having either two or more carboxyl groups or hydroxyl groups are successively injected into the second reactor. Then, the polymer, the second monomer mixture and the compound having either two or more carboxyl groups or hydroxyl groups are polymerized in the second reactor.

The second monomer mixture may further optionally comprise a (meth)acrylic acid alkyl ester.

For example, the second monomer mixture can comprise about 60 to about 95% by weight of an aromatic vinyl-based compound, about 5 to about 40% by weight of a vinyl cyanide based compound, and about 0 to about 10% by weight of a (meth)acrylic acid alkyl ester. If amounts of the respective components the second monomer mixture are outside of the above amounts, the basic physical properties of the thermoplastic resin including impact resistance, yellowness, flow characteristics and the like may rapidly change.

As another example, the aromatic vinyl-cyanide vinyl based copolymer (B) can comprise about 60 to about 84% by weight of an aromatic vinyl-based compound, about 15 to about 35% by weight of a vinyl cyanide based compound, and about 1 to about 5% by weight of a (meth)acrylic acid alkyl ester.

The polymer polymerized in the first reactor forms a dispersed phase by reaction with the compound having either two or more carboxyl groups or hydroxyl groups in the second reactor.

More particularly, the epoxy group of the (meth)acrylic acid glycidyl ester unit which is included in the polymer of the first reactor forms a dispersed phase by ester linkage with the compound having either two or more carboxyl groups or two or more hydroxyl groups, and imparts an excellent low gloss characteristics.

Further, the second monomer mixture comprising an aromatic vinyl-based compound, a vinyl cyanide based compound, and optionally a (meth)acrylic acid alkyl ester compound forms a continuous phase by polymerizing in the second reactor.

In an exemplary embodiment of the present invention, the polymerization conversion ratio of a thermoplastic resin can be 85 to about 95% in a first reactor, and a final conversion ratio can be about 50 to about 70% in a final reactor.

If the conversion ratio in the first reactor is less than 85%, it can be difficult to form a dispersed phase in the later process, because of excess unreacted reactant. If the conversion ratio in the first reactor is more than about 95%, however, the polymerization times can increase and the processing costs can be expensive.

In an exemplary embodiment of the present invention, the first monomer mixture further comprises an initiator in the first reactor, and optionally a solvent and a molecular weight regulator may be used.

Also, the second monomer mixture may further comprise an initiator in the second reactor, and optionally a solvent and a molecular weight regulator may be used.

In the first reactor, about 5 to about 200 parts by weight of the solvent, about 0.1 to about 0.4 parts by weight of the initiator and about 0 to about 0.2 parts by weight of the molecular weight regulator, each based on about 100 parts by weight of the first monomer mixture, can be injected.

In the second reactor, about 0 to about 20 parts by weight of the solvent, about 0.01 to about 0.05 parts by weight of the initiator and about 0 to about 0.5 parts by weight of the molecular weight regulator, each based on about 100 parts by weight of the second monomer mixture, can be injected.

Examples of the solvent may comprise, but are not limited to, ethyl benzene, xylene, toluene, methyl ethyl ketone and the like. The solvent may be employed singly or in the form of combinations of two or more thereof. The solvent may be used for effective heat transfer and agitation of reactants in the polymerization process.

Examples of the initiator may comprise, but are not limited to, azobis isobutyronitrile, benzoyl peroxide, 1,1-bis(t-butylperoxy)-2-methylcyclohexane, 1,1-bis(t-butylperoxy)cyclohexane, 2-bis(4,4-di-t-butylperoxy cyclohexane)propane, t-hexyl peroxy isopropyl monocarbonate, t-butyl peroxy maleic acid, t-butyl peroxy-3,5,5-trimethyl hexanoate, t-butyl peroxy laurate, 2,5-dimethyl-2,5-bis(m-toluoyl peroxy)hexane, t-butyl peroxy isopropyl monocarbonate, t-butyl peroxy-2-ethylhexyl monocarbonate, t-hexyl peroxybenzoate, 2,5-dimethyl-2,5-bis(benzoyl peroxy)hexane, t-butyl peroxyacetate, 2,2-bis(t-butyl peroxy)butane, t-butyl peroxybenzoate, n-butyl-4,4-bis(t-butyl peroxy)valerate, and the like, and combinations thereof.

Examples of the molecular weight regulator may comprise, but are not limited to, t-dodecyl mercaptan, n-dodecyl mercaptan and the like, and combinations thereof. The molecular weight regulator serves to regulate the molecular weight of a disperse phase.

In exemplary embodiments of the present invention, the reaction temperature of the first reactor can range from about 60 to about 120° C., and as another example about 70 to about 100° C. Further, the residence time in the first reactor can range from about 6 to about 10 hours, and as another example about 7 to about 9 hours.

The reaction temperature of the second reactor can range from about 90 to about 130° C., and as another example about 100 to about 120° C. Further, the residence time in the second reactor can range from about 1 to about 4 hours, and as another example about 1 to about 3 hours.

In one exemplary embodiment of the present invention, the flow rate can be controlled so that a reactant injected into the second reactor includes about 5 to about 15% by weight of the polymer polymerized in the first reactor and about 85 to about 95% by weight of the total of the second monomer mixture and the compound having either two or more carboxyl groups or hydroxyl groups.

If a composition for the reactant injected into the second reactor is controlled as mentioned above, a thermoplastic resin comprising about 5 to about 35% by weight of a (meth)acrylic acid alkyl ester-based polymer (A) and about 65 to about 95% by weight of an aromatic vinyl-cyanide vinyl based copolymer (B) may be prepared.

In one exemplary embodiment of the present invention, the compound having either two or more carboxyl groups or hydroxyl groups injected into the second reactor can be injected in the equivalent ratio of about 0.1 to about 3, as another example about 0.1 to about 2.5, and as another example about 0.5 to about 2.0 with respect to the (meth)acrylic acid glycidyl ester injected into the first reactor.

If the compound having either two or more hydroxyl groups is injected in an equivalent ratio of less than about 0.1 with respect to the (meth)acrylic acid glycidyl ester, or the compound having two or more carboxyl groups is injected in an equivalent ratio of less than about 0.1 with respect to the (meth)acrylic acid glycidyl ester, it can be difficult to form a network-shaped disperse phase since links between the chains of the (meth)acrylic acid alkyl ester-based polymer (A) may not be sufficient. Also, if the compound having either two or more hydroxyl groups or carboxyl groups is injected in an equivalent ratio of more than about 3, thermal resistance may be rapidly deteriorated since excess of the compound having either two or more hydroxyl groups or two or more carboxyl groups which do not participate in the reaction can function as a plasticizer in the continuous phase.

In the present invention, the plural reactors can include 2 to 5 reactors, and the polymerization reaction can be successively carried out through the respective reactors.

The final polymerization conversion ratio into a thermoplastic resin in a final reactor in which the polymerization is finished can be about 50 to about 70%, and as another example about 50 to about 65%. If the final polymerization conversion ratio is less than about 50%, the amount of the thermoplastic resin prepared per unit time decreases, which is not commercially useful. It may be difficult to control the reaction heat and transfer the polymer since viscosity of the polymer rapidly increases if the final polymerization conversion ratio is more than about 70%.

In a further exemplary embodiment of the present invention, the preparation method may further comprise the step of separating non-reacted material from the final polymer using a devolatilization vessel under conditions of high temperature and vacuum state after preparing the final polymer including network-shaped disperse and continuous phases through the successive polymerization process in the plural reactors as mentioned above. Then, the prepared thermoplastic resin may be formed in the shape of pellets by using a pelletizer or the like.

The present invention will be well understood by the following examples. The following examples of the present invention are only for illustrative purposes and are not construed as being limited to the scope of the present invention defined by the appended claims.

EXAMPLES

Example 1

A first reactant is prepared by mixing about 35 parts by weight of toluene, about 0.2 parts by weight of benzoyl peroxide (BPO) and about 0.03 parts by weight of t-dodecyl mercaptan (TDM) with about 100 parts by weight of a first monomer mixture including about 90 parts by weight of butyl acrylate (BA), about 4 parts by weight of styrene (SM), about 2 parts by weight of acrylonitrile (AN) and about 4 parts by weight of glycidyl methacrylate (GMA).

A polymer is prepared by polymerizing the first reactant at a temperature of about 80° C. for a residence time of 8 hours after injecting the first reactant at a rate of about 2 kg/hr into a first reactor (R-1) of a continuous polymerization reactor having three reactors, which are connected to one another in series, and in which jackets are installed to easily control the reaction temperature. The polymerization conversion ratio is about 90%, and the polymer prepared in the first reactor (R-1) is successively injected into a second reactor (R-2) of the continuous polymerization reactor.

A second reactant is prepared by mixing about 25 parts by weight of toluene, about 0.025 parts by weight of 1,1-bis(t-butylperoxy)cyclohexane (PHX—C), about 0.1 parts by weight of t-dodecyl mercaptan (TDM) and about 1.44 parts by weight (an equivalent ratio of 1.0) of polyethylene glycol (PEG600) having a weight average molecular weight of about 600 with about 100 parts by weight of a second monomer mixture including about 72 parts by weight of styrene (SM), about 25 parts by weight of acrylonitrile (AN) and about 3 parts by weight of butyl acrylate (BA).

A polymer is prepared by polymerizing the second reactant at a temperature of about 115° C. for a residence time of about 2 hours after injecting the second reactant at a rate of about 11 kg/hr into the second reactor (R-2) of the continuous polymerization reactor. The polymerization conversion ratio is about 30%.

The polymer prepared in the second reactor (R-2) is successively injected into a third reactor (R-3) of the continuous polymerization reactor to polymerize the prepared polymer at a temperature of about 130° C. for a residence time of about 2 hours. The polymerization conversion ratio is about 65%.

The flow index of the thermoplastic resin is measured after successively injecting the resulting polymer discharged from the third reactor (R-3) into a devolatilization vessel maintained at about 240° C. and about 20 Torr, removing non-reacted monomers and solvents from the resulting polymer, and obtaining a thermoplastic resin in the shape of pellets using a pelletizer.

A weight-average molecular weight of a continuous phase of the thermoplastic resin and a content of a disperse phase therein are measured. Physical properties such as Izod impact strength, yellowness, Vicat softening point, and the like are measured from specimens for measuring physical properties, which are manufactured by injection molding the thermoplastic resin. In addition, physical properties such as gloss, delamination characteristics, falling ball impact strength, weatherability and the like are measured from an extruded sheet having a thickness of about 10 mm which is manufactured from the thermoplastic resin using a T-die of about 190° C. The measured results are reported in the following Table 1.

Methods of measuring physical properties:

(1) Flow index (g/10 min) of a specimen is measured in accordance with ASTM D-1238, under a condition of about 220° C./10 kg.

(2) Weight-average molecular weight: An elution curve of a specimen is obtained by using THF as a moving bed through a gel permeation chromatography (GPC) at room temperature, and a relative number-average molecular weight, a weight-average molecular weight and a molecular weight distribution of the specimen are calculated (by using a GPC, LF-804 column from Waters Corporation) based on the standard polystyrene polymer.

(3) Content (%) of disperse phase: The oxygen content in the thermoplastic resin is measured by using Flash EA 1112 from Thermo Finnigan Corporation, and the content is calculated using molecular weight of an acrylate monomer.

(4) Izod impact strength (kgf·cm/cm) is measured in accordance with ASTM D256 under a ⅛" notched condition.

(5) Yellowness is measured in accordance with JIS K7105.

(6) Delamination characteristics of an extruded sheet are measured by giving a grade between one and five points depending on the degree of delamination after observing a surface state of the extruded sheet with the naked eye. Five points are given if delamination is not observed from the extruded sheet, and one point is given if delamination is observed all over the extruded sheet (Five points: highest grade, four points: higher grade, three points: medium grade, two points: lower grade, one point: lowest grade).

(7) Vicat softening point (° C.) of a specimen is measured in accordance with ISO R 306 under conditions of 5 kg and 50° C./HR.

(8) Gloss: 75 degree gloss is measured using a BYK-Gardner gloss meter.

(9) Falling ball impact strength (J) is measured in accordance with ASTM D4226.

(10) Weatherability: A ΔE value is measured in accordance with UL 746C.

Example 2

A thermoplastic resin is prepared by the same method as in Example 1 except that about 0.48 parts by weight (an equivalent ratio of 1.0) of decanedioic acid is used instead of about 1.44 parts by weight (an equivalent ratio of 1.0) of polyethylene glycol (PEG600). Physical properties are measured by the same methods as in Example 1, and the measured results are reported in the following Table 1.

Example 3

A thermoplastic resin is prepared by the same method as in Example 1 except that about 1.8 parts by weight (an equivalent ratio of 0.5) of polyethylene glycol (PEG1500) having a weight average molecular weight of 1500 is used instead of about 1.44 parts by weight (an equivalent ratio of 1.0) of polyethylene glycol (PEG600). Physical properties are measured by the same methods as in Example 1, and the measured results are reported in the following Table 1.

Example 4

A thermoplastic resin is prepared by the same method as in Example 1 except that a mixture of 25 parts by weight of toluene, about 0.025 parts by weight of 1,1-bis(t-butylperoxy)cyclohexane (PHX—C), about 0.2 parts by weight of t-dodecyl mercaptan (TDM) and about 0.48 parts by weight (an equivalent ratio of 1.0) of decanedioic acid with about 100 parts by weight of a second monomer mixture including about 72 parts by weight of styrene (SM), about 25 parts by weight of acrylonitrile and about 3 parts by weight of butyl acrylate is injected into the second reactor (R-2) of the continuous polymerization reactor at a rate of about 9.5 kg/hr. Physical properties are measured by the same methods as in Example 1, and the measured results are reported in the following Table 1.

Comparative Example 1

A thermoplastic resin in the shape of pellets is obtained by kneading (mixing) about 40 parts by weight of an acrylate rubber, in which styrene and acrylonitrile are grafted to a butyl acrylate rubber, and about 60 parts by weight of a styrene-acrylonitrile copolymer under a temperature condition of about 220° C. in a twin screw extruder. Physical properties are measured by the same methods as in Example 1, and the measured results are reported in the following Table 2.

Comparative Example 2

A thermoplastic resin is prepared by the same method as in Example 1 except that polyethylene glycol (PEG600) is not used at all. Physical properties are measured by the same methods as in Example 1, and the measured results are reported in the following Table 2.

Comparative Example 3

A thermoplastic resin is prepared by the same method as in Example 1 except that glycidyl methacrylate (GMA) is not used at all. Physical properties are measured by the same methods as in Example 1, and the measured results are reported in the following Table 2.

Comparative Example 4

A thermoplastic resin is prepared by the same method as in Example 1 except that about 5.15 parts by weight (an equivalent ratio of 3.5) of polyethylene glycol (PEG600) is used instead of about 1.44 parts by weight (an equivalent ratio of 1.0) thereof. Physical properties are measured by the same methods as in Example 1, and the measured results are reported in the following Table 2.

TABLE 1

|   |   | Example 1 | Example 2 | Example 3 | Example 4 |
|---|---|---|---|---|---|
| R1 | BA/SM/AN | 90/4/2 | 90/4/2 | 90/4/2 | 90/4/2 |
|  | GMA | 4 | 4 | 4 | 4 |
|  | Toluene | 35 | 35 | 35 | 35 |
|  | BPO | 0.2 | 0.2 | 0.2 | 0.2 |
|  | TDM | 0.03 | 0.03 | 0.03 | 0.03 |
|  | flow rate (kg/hr) | 2 | 2 | 2 | 2 |
|  | T (° C.) | 90 | 90 | 90 | 90 |
|  | residence time (hr) | 8 | 8 | 8 | 8 |
|  | Conversion (%) | 90 | 90 | 90 | 90 |
| R2 | BA/SM/AN | 72/25/3 | 72/25/3 | 72/25/3 | 72/25/3 |
|  | compound having either two or more carboxyl groups or two or more hydroxyl groups | PEG600 | decanedioic acid | PEG1500 | decanedioic acid |
|  | equivalent ratio | 1 | 1 | 0.5 | 1.5 |
|  | Toluene | 25 | 25 | 25 | 25 |
|  | PHX-C | 0.025 | 0.025 | 0.025 | 0.025 |
|  | TDM | 0.1 | 0.1 | 0.1 | 0.2 |
|  | flow rate (kg/hr) | 11 | 11 | 11 | 9.5 |
|  | T (° C.) | 115 | 115 | 115 | 115 |
|  | residence time (hr) | 2 | 2 | 2 | 2 |
|  | Conversion (%) | 30 | 30 | 30 | 30 |
| R3 | T (° C.) | 130 | 130 | 130 | 130 |
|  | residence time (hr) | 2 | 2 | 2 | 2 |
|  | Conversion (%) | 65 | 65 | 65 | 65 |
| Properties | Flow index (g/10 min) | 6.5 | 7.2 | 6.8 | 6.5 |
|  | weight-average molecular weight | 195,000 | 210,000 | 203,000 | 192,000 |
|  | content (%) of disperse phase | 18.5 | 18.6 | 18.5 | 20.8 |
|  | Izod impact strength (kgf · cm/cm) | 11.5 | 11.3 | 11.8 | 12.8 |
|  | Yellowness | 18.5 | 19.3 | 18.3 | 19.7 |
|  | Vicat softening point (° C.) | 90 | 90.5 | 89.5 | 88.5 |
|  | Gloss | 18.7 | 19.5 | 19.2 | 18.3 |
|  | Delamination characteristics | 5 | 5 | 5 | 5 |
|  | Falling ball impact strength (J) | 5.8 | 6.1 | 5.9 | 6.3 |
|  | Weatherability | 2.5 | 2.7 | 2.6 | 2.5 |

TABLE 2

|   |   | Comp. EX. 1 | Comp. EX. 2 | Comp. EX 3 | Comp. EX. 4 |
|---|---|---|---|---|---|
| R1 | BA/SM/AN | — | 90/4/2 | 90/4/2 | 90/4/2 |
|  | GMA | — | 4 | — | 4 |
|  | Toluene | — | 35 | 35 | 35 |
|  | BPO | — | 0.2 | 0.2 | 0.2 |

TABLE 2-continued

|  |  | Comp. EX. 1 | Comp. EX. 2 | Comp. EX 3 | Comp. EX. 4 |
|---|---|---|---|---|---|
|  | TDM | — | 0.03 | 0.03 | 0.03 |
|  | flow rate (kg/hr) | — | 2 | 2 | 2 |
|  | T (° C.) | — | 90 | 90 | 90 |
|  | residence time (hr) | — | 8 | 8 | 8 |
|  | Conversion (%) | — | 90 | 90 | 90 |
| R2 | BA/SM/AN | — | 72/25/3 | 72/25/3 | 72/25/3 |
|  | compound having either two or more carboxyl groups or two or more hydroxyl groups | — | — | decanedioic acid | PEG600 |
|  | equivalent ratio | — | — | 1 | 3.5 |
|  | Toluene | — | 25 | 25 | 25 |
|  | PHX-C | — | 0.025 | 0.025 | 0.025 |
|  | TDM | — | 0.1 | 0.1 | 0.1 |
|  | flow rate (kg/hr) | — | 11 | 11 | 11 |
|  | T (° C.) | — | 115 | 115 | 115 |
|  | residence time (hr) | — | 2 | 2 | 2 |
|  | Conversion (%) | — | 30 | 30 | 30 |
| R3 | T (° C.) | — | 130 | 130 | 130 |
|  | residence time (hr) | — | 2 | 2 | 2 |
|  | Conversion (%) | — | 65 | 65 | 65 |
| Properties | Flow index (g/10 min) | 4.3 | 11.6 | 17.3 | 16.2 |
|  | weight-average molecular weight | 140,000 | 196,000 | 182,000 | 192,000 |
|  | content (%) of disperse phase | 19.5 | 18.6 | 18.3 | 18.1 |
|  | Izod impact strength (kgf · cm/cm) | 11.2 | 4.3 | 4.1 | 6.7 |
|  | Yellowness | 25.5 | 18.7 | 18.5 | 18.8 |
|  | Vicat softening point (° C.) | 90 | 90.5 | 82.5 | 84.5 |
|  | Gloss | 93 | 42 | 45 | 39 |
|  | Delamination characteristics | 4 | 3 | 2 | 4 |
|  | Falling ball impact strength (J) | 6.2 | 2.5 | 2.3 | 3.8 |
|  | Weatherability | 2.8 | 2.6 | 2.7 | 2.6 |

As shown in tables 1 and 2, the thermoplastic resin composition of the present invention which is prepared in Examples 1 to 4 has an excellent low gloss value of about 30 or less which is measured using a 75 Degree Gloss Meter with maintaining flowability, Izod impact strength, Vicat softening point, Falling ball impact strength of a general thermoplastic resin.

Further, the thermoplastic resin composition of the present invention which is prepared in Examples 1 to 4 has good delamination characteristics and improved yellowness.

In contrast, while the thermoplastic resin composition of Comparative Example 1 comprising small rubber phase and prepared by kneading (mixing) in a twin screw extruder has a good Izod impact strength, Falling ball impact strength, its gloss value is high.

Comparative Example 2 which does not include a compound having two or more carboxyl groups or hydroxyl groups has an increased gloss value, deteriorated impact strength and delamination characteristics.

Also, Comparative Example 3 which does not use a (meth) acrylic acid glycidyl ester has an increased gloss value, deteriorated impact strength and delamination characteristics.

Comparative Example 4 including an excessive amount of a compound having two or more carboxyl groups or hydroxyl groups in comparison with the Examples 1 to 4 represents a rapidly decreased Vicat softening point because the compound having two or more carboxyl groups or hydroxyl groups does not participate in the reaction and can function as a plasticizer In conclusion, as shown in the Examples and Comparative Examples, the thermoplastic resin composition of the present invention can have an excellent low gloss characteristic while maintaining basic physical properties of a weather resistance, impact strength, thermal resistance, and delamination characteristics.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A weatherable thermoplastic resin composition comprising:
    (A) a (meth)acrylic acid alkyl ester-based polymer forming a network-shaped disperse phase, wherein said (meth) acrylic acid alkyl ester-based polymer (A) is prepared by polymerizing a mixture comprising a (meth)acrylic acid alkyl ester, a (meth)acrylic acid glycidyl ester, and a compound having either two or more carboxyl groups or two or more hydroxyl groups; and
    (B) an aromatic vinyl-cyanide vinyl based copolymer forming a continuous phase.

2. The weatherable thermoplastic resin composition of claim 1, wherein said thermoplastic resin composition comprises about 5 to about 35% by weight of the (meth)acrylic acid alkyl ester-based polymer (A), and about 65 to about 95% by weight of the aromatic vinyl-cyanide vinyl based copolymer (B).

3. The weatherable thermoplastic resin composition of claim 1, wherein said (meth)acrylic acid alkyl ester-based polymer (A) comprises about 60 to about 95% by weight of a (meth)acrylic acid alkyl ester; about 1 to about 20% by weight of a (meth)acrylic acid glycidyl ester; about 0 to about 20% by weight of an aromatic vinyl-based compound; and about 0 to about 10% by weight of a vinyl cyanide based compound.

4. The weatherable thermoplastic resin composition of claim 1, wherein said (meth)acrylic acid alkyl ester-based polymer (A) includes a polymerized compound with either two or more carboxyl groups or two or more hydroxyl groups in an equivalent ratio of about 0.1 to about 3 with respect to the (meth)acrylic acid glycidyl ester.

5. The weatherable thermoplastic resin composition of claim 1, wherein said (meth)acrylic acid alkyl ester comprises methyl methacrylate, ethyl methacrylate, propyl methacrylate, butyl methacrylate, pentyl methacrylate, hexyl methacrylate, heptyl methacrylate, octyl methacrylate, 2-ethyl hexyl methacrylate, methyl acrylate, ethyl acrylate, propyl acrylate, butyl acrylate, pentyl acrylate, hexyl acrylate, heptyl acrylate, octyl acrylate, 2-ethyl hexyl acrylate, or a combination thereof.

6. The weatherable thermoplastic resin composition of claim 1, wherein said (meth)acrylate acid glycidyl ester compound comprises glycidyl acrylate, glycidyl (meth)acrylate, or a combination thereof.

7. The weatherable thermoplastic resin composition of claim 1, wherein said compound having two or more carboxyl groups comprises a C2 to C10 alkanedioic acid, polyacid, or a combination thereof 8. The weatherable thermoplastic resin composition of claim 1, wherein said compound having two or more hydroxyl groups comprises a C2 to C10 alkanediol, ethylene glycol, polyethylene glycol, propylene glycol, polypropylene glycol, polyol, or a combination thereof.

9. The weatherable thermoplastic resin composition of claim 1, wherein said (meth)acrylic acid alkyl ester-based polymer (A) comprises a (meth)acrylic acid alkyl ester unit and a (meth)acrylic acid glycidyl ester unit as a main chain, and an epoxy group of the (meth)acrylic acid glycidyl ester unit is linked to the carboxyl groups or hydroxyl groups of the compound having either two or more carboxyl groups or two or more hydroxyl groups by ester bonds.

10. The weatherable thermoplastic resin composition of claim 1, wherein said aromatic vinyl-cyanide vinyl based copolymer (B) is prepared by polymerizing about 60 to about 95% by weight of an aromatic vinyl-based compound, about 5 to about 40% by weight of a vinyl cyanide based compound, and about 0 to about 10% by weight of a (meth)acrylic acid alkyl ester.

11. The weatherable thermoplastic resin composition of claim 1, wherein said aromatic vinyl-cyanide vinyl based copolymer (B) have a weight-average molecular weight of about 150,000 to about 300,000.

12. The weatherable thermoplastic resin composition of claim 10, wherein said aromatic vinyl-based compound comprises styrene, a-methyl styrene, para-methyl styrene, or a combination thereof; and wherein said vinyl cyanide based compound comprises acrylonitrile, methacrylonitrile, ethacrylonitrile, or a combination thereof.

13. The weatherable thermoplastic resin composition of claim 1, the thermoplastic resin has a gloss value of about 30 or less, which is measured using a 75 Degree Gloss Meter.

* * * * *

UNITED STATES PATENT AND TRADEMARK OFFICE
CERTIFICATE OF CORRECTION

PATENT NO. : 8,507,609 B2
APPLICATION NO. : 12/979448
DATED : August 13, 2013
INVENTOR(S) : Young Sub Jin et al.

Page 1 of 1

It is certified that error appears in the above-identified patent and that said Letters Patent is hereby corrected as shown below:

In the Specification

Column 7, Line 30 reads: "Morez-101 of Rohm and Hass Corporation, ~~Joneryl~~-678 and"
and should read: "Morez-101 of Rohm and Hass Corporation, Joncryl-678 and"

In the Claims

Claim 12, Column 20, Line 22 reads: "prises styrene ~~a-methyl~~ styrene, para-methyl styrene, or a"
and should read: "prises styrene α-methyl styrene, para-methyl styrene, or a"

Signed and Sealed this
Eighth Day of April, 2014

Michelle K. Lee
*Deputy Director of the United States Patent and Trademark Office*